Dec. 12, 1933.  K. W. CONNOR  1,939,205
HONING TOOL AND FIXTURE
Filed July 15, 1932  3 Sheets-Sheet 1
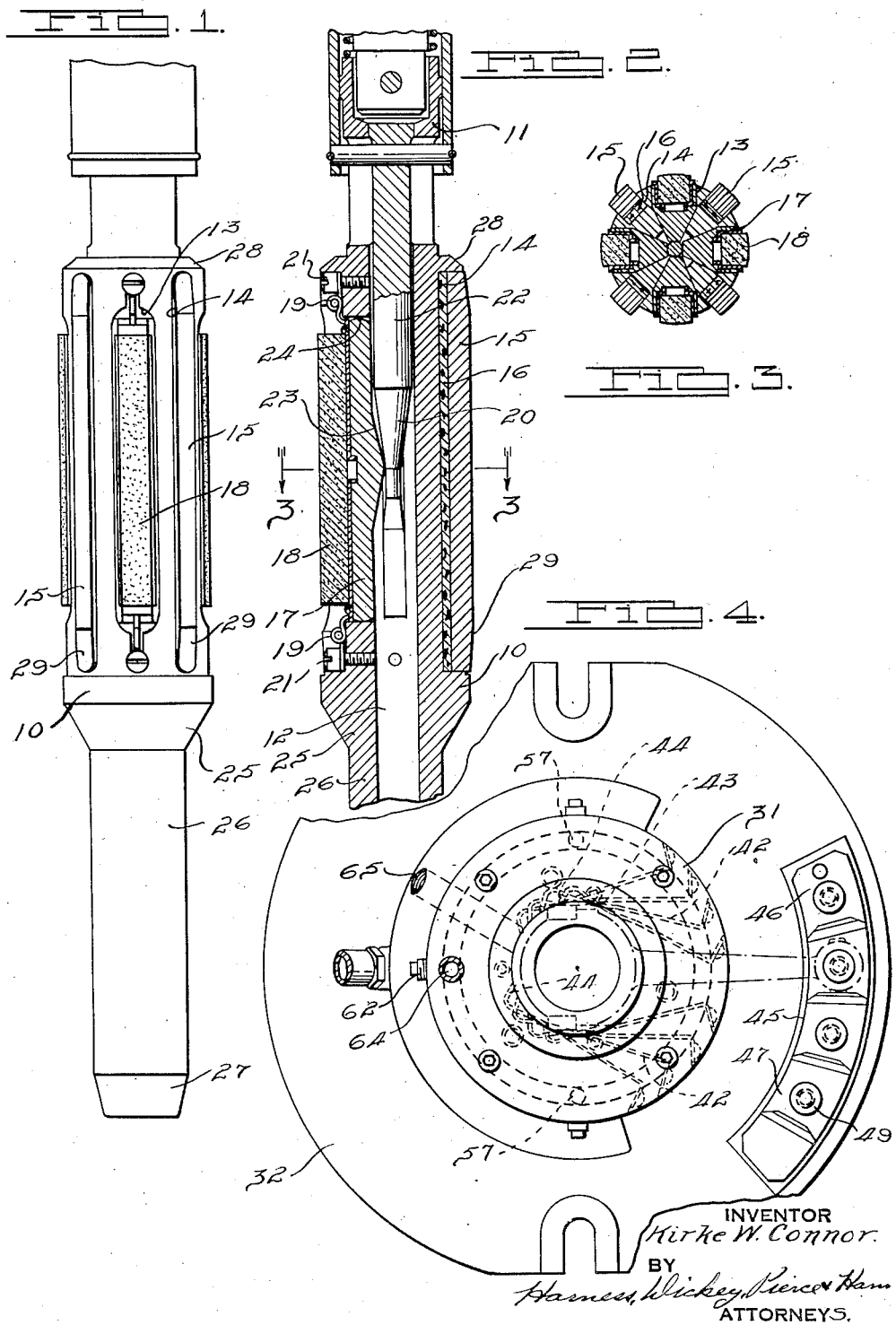
INVENTOR
Kirke W. Connor.
BY
Harness, Dickey, Pierce & Ham
ATTORNEYS.

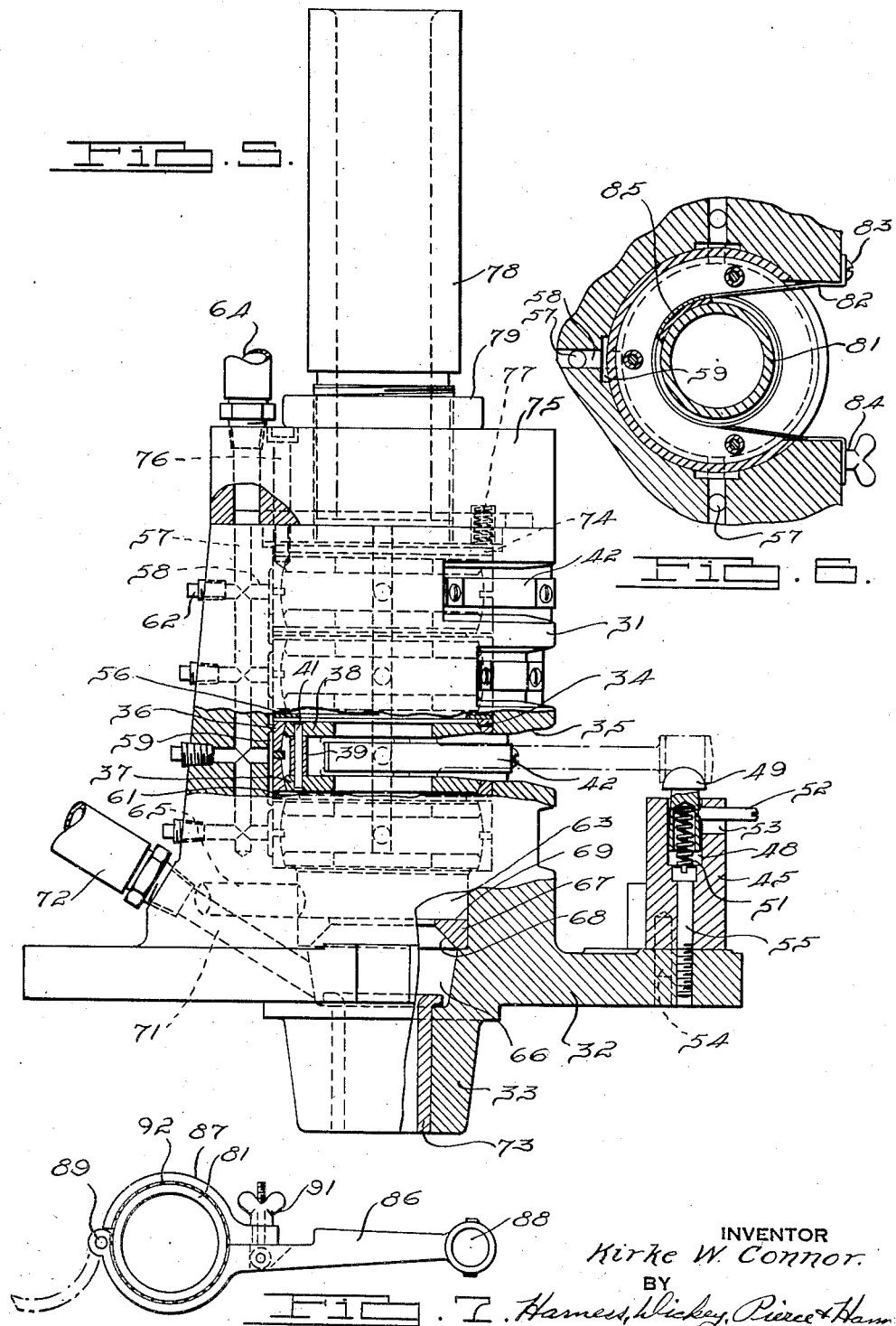

Dec. 12, 1933.　　　　K. W. CONNOR　　　　1,939,205
HONING TOOL AND FIXTURE
Filed July 15, 1932　　　3 Sheets-Sheet 3
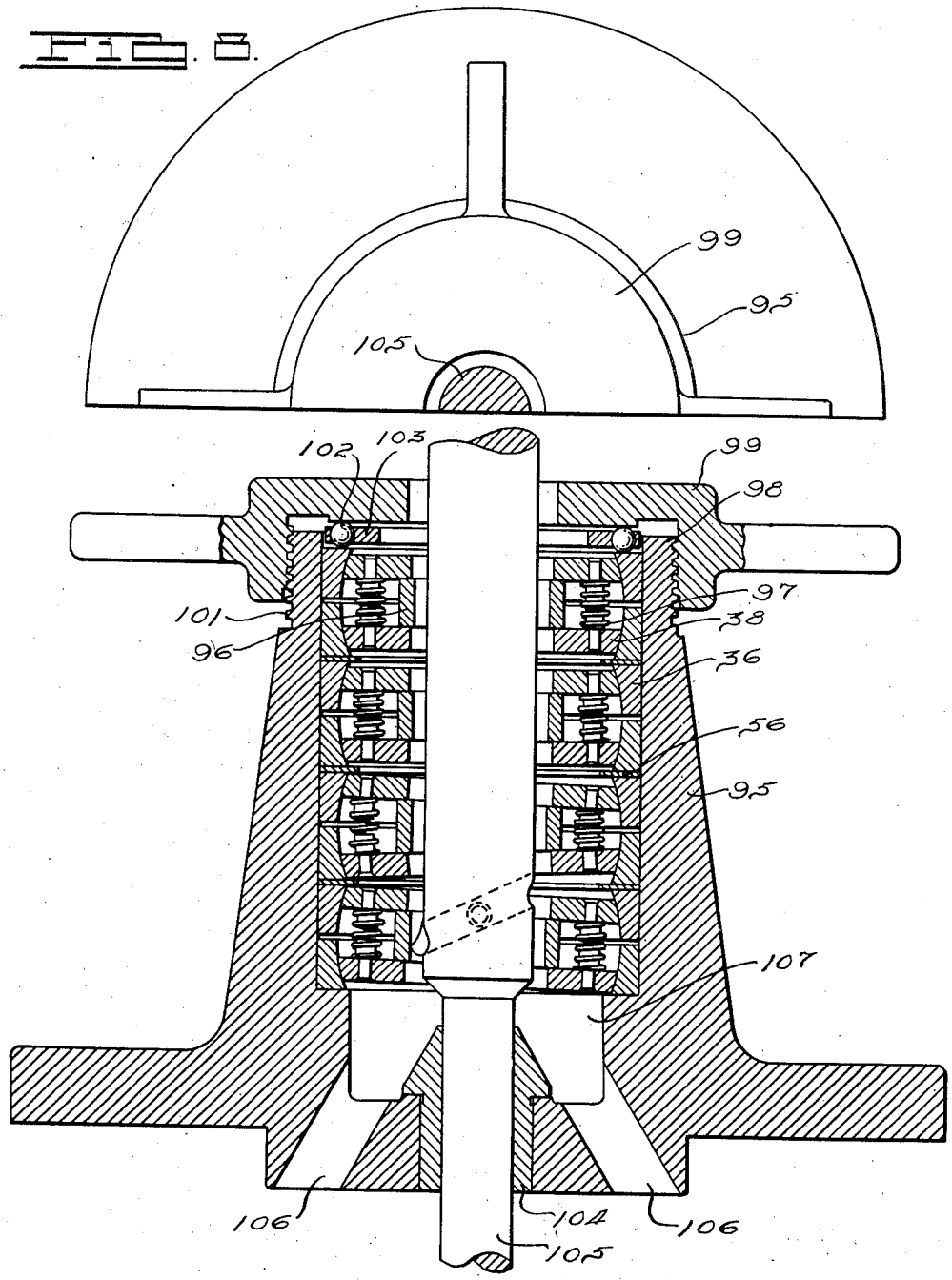

Patented Dec. 12, 1933

1,939,205

UNITED STATES PATENT OFFICE 1,939,205

HONING TOOL AND FIXTURE

Kirke W. Connor, Detroit, Mich., assignor to Micromatic Hone Corporation, a corporation of Michigan Application July 15, 1932. Serial No. 622,687

17 Claims. (Cl. 51—217)

My invention relates to method and means for honing cylindrical elements and particularly for honing an element the length of which is less than the diameter of the cylindrical aperture to be honed.

When honing tools were employed heretofore, they were more or less limited to structures wherein the length of the aperture was substantially equal to or greater than its diameter. This was necessary so as to retain the honing element in aligned relation to prevent them from tilting angularly as the tool was reciprocated or otherwise a tapered form would be machined on the cylindrical wall. When the length of the cylindrical aperture was equal to or greater than its diameter, the abrading elements were retained in parallel relation during the tool's reciprocation and an accurate cylindrical surface was machined therein.

My present invention relates to a tool and fixture which operate in combination with each other to accurately machine apertures, the lengths of which are less than their diameters without any danger of machining anything but a true cylindrical surface therein. The particular work elements herein illustrated and described are connecting rod crankshaft bearings or plane annular bearings which are to be machined to accurate dimensions. The cylindrical wall of the bearings have diameters several times greater than the thickness of the bearing and are of a type which was impossible to machine heretofore to accurate dimensions by a honing operation. A fixture is provided for receiving a plurality of the bearings in substantially aligned relation and a honing tool is so constructed as to align the bearing as the tool is inserted and reciprocated through the apertures thereof.

In a modified form of fixture, the bearings are first accurately aligned relative to the surface to be machined and clamped in aligned position while so held.

Accordingly the main objects of my invention are: to provide a fixture for retaining a plurality of elements in substantially aligned position supported to have a tilting movement in substantially any direction; to provide a tool having guiding portions thereon for aligning the bearings and retaining them in accurate aligned relation during the honing operation; to provide means for retaining the work elements in substantially aligned relation and free to tilt in substantially any direction with means for preventing the element from rotating in the presence of the rotating of the honing tool; to provide a fluid system in the fixture for washing out the abraded material and for lubricating the tool; to provide means for clamping the bearings in fixed position when centered relative to the surface to be machined; and in general to provide a fixture and a honing tool which readily receives and accurately finishes work elements, the diameters of which are less than their thickness.

Other objects and features of novelty of my invention will be either specifically pointed out or will become apparent when referring, for a better understanding of my invention, to the following description in conjunction with the accompanying drawings, wherein:

Figure 1 is a view in elevation of the abrading end of a honing tool embodying features of my invention;

Fig. 2 is a sectional view, in elevation, of the structure illustrated in Fig. 1;

Fig. 3 is a sectional view of the structure illustrated in Fig. 2, taken on the line 3—3 thereof;

Fig. 4 is a plan view of a fixture for machining and positioning working elements which embodies features of my invention;

Fig 5 is a view partly in section and partly in elevation of the fixture illustrated in Fig. 4;

Fig. 6 is a reduced sectional view of a fixture showing a modified form of holding tool therefor;

Fig. 7 is a plan view of a further modified form of holding element embodying features of my invention;

Fig. 8 is a broken plan view of a fixture embodying a modified form of my invention; and Fig. 9 is a sectional view, in elevation, of the structure illustrated in Fig. 8.

Referring to Figs. 1, 2 and 3, I have illustrated a honing tool which is constructed to operate in conjunction with the fixture for supporting the work to align the work therein so as to effect the accurate honing of the inner cylindrical surfaces thereof. The honing tool is provided with a body portion 10 which is connected through a universal joint 11 to an operating head of the collapsible type (not shown) which is described and claimed in the co-pending application of F. W. Kern, Ser. No. 521,090, filed March 9, 1931, and assigned to the assignee of the present invention. A central aperture 12 passes through the body portion 10 having four radial slots 13 equally spaced and communicating therewith, as illustrated in Fig. 3. Medially between the slots 13, elongated longitudinally extending recesses 14 are provided in which guiding elements 15 are disposed adjacent to resilient strips 16 which are placed within the bottom of the slot. The resilient element is preferably cork or similar material, such as rubber or the like, which is glued, vulcanized or otherwise secured to the bottom of the slot and to the inner surface of the guiding element 15.

Receiving members or shoes 17 are employed with the abrading elements 18, both of which are mounted in slots 13 and retained therein by suitable springs 19 mounted on the body portion of the tool, at the end of the abrading element, by screws 21. A plunger 22 is longitudinally movable in the aperture 12 through the adjustment of the adjusting head (not shown), and a truncated conical surface 20 is provided on its lower end in engagement with the apexes 23 on the inner side of the shoes 17, for effecting the lateral movement of the honing elements. The ends of the shoes 17 are provided with an arcuate surface 24 which permits the rocking of the abrading elements and the shoes relative to the plunger 22. In Fig. 3 it will be noted that the abrading elements, when in collapsed position, are disposed inwardly of the surfaces of the guiding elements 15 to permit the guiding elements to engage the work before the abrading elements are expanded to engage the sides of the cylinder wall.

The body portion 10 of the abrading end of the tool is provided with a sloping collar 25 which is further extended at 26 to form a pilot having a tapered end 27 for guiding the tool relative to the fixture. A similar shoulder 28 is provided at the top of the tool to guide the work relative thereto when the tool is being withdrawn from the fixture. The guiding elements 15, in like manner, are provided with sloping ends 29 for the purpose of centering the work relative to the main body portion of the tool to aid in guiding the work element relative to the abrading elements.

Referring to Figs. 4 and 5, I have illustrated a fixture which is employed for receiving the work elements in the nature of connecting rod bearings, to be machined by my honing tool above described. A hollow cylindrical housing 31 is provided with a flange 32 for connecting the housing to a table or other suitable supporting means, with a bearing hub 33 projecting therebelow. A plurality of connecting rods bearing receiving elements 34 is supported within the cylindrical aperture in the housing 31 communicating through a plurality of apertures 35 in the outside of the housing. The apertures are in offset angular relation for the purpose of permitting engaging means for the protruding end of the connecting rod to be positioned relatively close together outwardly of the housing.

A receiving element 34 includes a pair of oppositely disposed annular members 36 the inner surfaces of which are of spherical shape as in a bearing race, for receiving a unit 37 having spherical edges in engagement with the surfaces on the members 36. The element 37 is composed of a pair of oppositely disposed plates 38, spaced apart substantially the thickness of the connecting rod and bearing by suitable spacing elements 39 all of which are retained together by rivets 41. The plates slope inwardly at the front end in the same manner as the recesses 35 for guiding the bearings to a position between the plates.

Flat springs 42 extend inwardly of the slots 35 on each of its sides, terminating in arcuate portions 43 for engaging the side bolt receiving shoulders and having the ends bent inwardly at 44 for receiving the ends of the bolt. The springs, when engaging a connecting rod bearing, position the bearings substantially centrally of the plates, laterally through the engagement of the arcuate sides of the portion 43 of the springs and longitudinally through the engagement of the inwardly extending portion of the spring 42.

Frontwardly of the housing 33 an upstanding member 45 is mounted having steps of increasing height, starting with the lower step 46 to the highest step 47. The top surface of each step is provided with an aperture 48 in which a mushroom headed pin 49 is mounted, having sides inwardly sloping from the bottom of the pin to permit the free play of the pin in the aperture. A spring 51 is recessed in the pin and extends to the bottom of the aperture 48 for urging the mushroom pin upwardly therein. A handle 52 extends through a slot 53 in the member 45, for limiting the upward movement of the mushroom pin and employed to effect its downward movement to permit the mounting of a connecting rod within the fixture. Suitable dowel pins 54 position the element 45 relative to the flange 32 and suitable screws 55 retain the element in fixed relation thereto. In this construction after the connecting rod has been placed between the pair of plates 38, the wrist pin end thereof rests upon the mushroom headed pin 49 and permits the connecting rod to tilt in substantially any plane.

Between each of the units 34, spacers 56 are provided for preventing the elements 37 from being tilted out of the confines of the annular members 36 during the machining or assembling operation. Any number of the elements may be mounted together in a single fixture, four being herein illustrated, each disposed opposite a slot 35 for receiving four work units which may be machined during a single operation of the honing tool therethrough.

Vertically extending apertures 57 are provided at various points around the periphery of the housing 31, in Fig. 4 three such apertures being illustrated. Apertures 58 communicate with the apertures 57 adjacent to each of the units 34, to be connected by recesses 59 to recesses 61 disposed about the spacing washers 56. After the holes have been drilled, suitable plugs 62 are employed for closing the holes against the flow of fluid outwardly of the holder. A reservoir 63 is constructed below the lowermost element, as illustrated in Fig. 5, for receiving the abrasive material and metal freed from the tool and work. An inlet port 64 is connected to the top of the aperture 57 for introducing a cooling fluid for preventing the heating of the tool and for washing the freed material from the fixture. An outlet 65 is connected to the reservoir 63 for the purpose of conducting the fluid therefrom.

A second reservoir 66 is provided below the reservoir 63, being separated therefrom by the annular baffle 67 having a sloping surface 68 for permitting a ready flow of fluid upwardly from the reservoir 66, and a shelf 69 on its upper surface for resisting a downward flow of fluid from the reservoir 63. An aperture 71 connects the reservoir 66 to the outer surface of the housing 33 where a suitable intake conduit 72 is connected for introducing the fluid to the reservoir.

Within the hub 63, a bearing 73 is mounted for the purpose of receiving and accurately guiding the pilot end 26 of the honing tool. The pilot fits snugly within the bearing 73 and the fluid delivered to the reservoir 66 through the conduit 72, lubricates the sides of the bearing and pilot during operation. The clean fluid thus introduced into the reservoir 66 flows upwardly therefrom into the reservoir 63, in view of the baffle 68, and prevents the fluid in the reservoir 63 containing the freed material from passing into the reservoir 66. In this manner the pilot is lubricated by clean liquid and the liquid containing the abraded material is prevented from contacting therewith.

After a plurality of the units 34 is assembled within the aperture in the housing 31, a top plate 74 is positioned thereabove and a cap 75 is secured to the top of the housing by suitable screws 76, and springs 77 are nested in the cap in engagement with the top surface of the plate 74 for forcing all of the elements 34 into intimate relation. A sleeve 78 is threaded into the central aperture of the cap 75, being adjustable relative thereto and securable in fixed position by the lock nut 79. The sleeve controls the expansion and contraction of the honing elements 18 as the tool is inserted into and removed from the fixture. Fingers are provided on the adjusting head of the tool which normally are biased outwardly to withdraw the plunger 22 upwardly in the aperture 12 of the tool, to permit the abrading element 18 to be retracted or drawn inwardly of the body portion 10 within the diameter of the guiding elements 15.

The tool is then inserted through the sleeve 78 to within the fixture and after the abrading head thereof has reached a predetermined position therewithin, the fingers contact with the sleeve 78 to cause the plunger 22 to move downwardly and thereby expand the abrading element 18 against the side surfaces of the work element with a predetermined pressure. The tool is then reciprocated and rotated, the reciprocation being within predetermined limits and after a predetermined number thereof, the tool is withdrawn. Upon the initial withdrawal movement, the fingers on the tool adjusting head move out of engagement with the sleeve 78 and collapse the honing elements before the tool is withdrawn from the work elements. In this manner the honing operation is accomplished only after the abrading elements are positioned relative to the work and are collapsed before being withdrawn from this position.

As the pilot end 26 of the tool is inserted through the sleeve 78 into the fixture, it will pass through the elements 34 and the connecting rod bearings and be guided by the sloping ends 27 into the bearing 73 of the flange 32. The tool will then be in accurate aligned position and the sloping surface 25 will have accurately centered the bearings relative to the tool so that the guiding element 15 will rub along the cylindrical surface of the bearing to accurately position them relative thereto. This positioning is made possible through the mounting of the connecting rods in the fixture in such manner as to have them tiltable in all directions.

Further movement of the tool causes the expansion of the honing element, as above pointed out, and after a predetermined number of reciprocations within predetermined limits the honing operation is completed to have the inner surface of the connecting rod bearings machined to accurate dimensions. Thereafter the tool is withdrawn, the initial withdrawal movement collapsing the honing elements out of contact with the finished cylinder surface. In this manner, a very rapid machining of the bearings occurs to have the bearings machined to the same accurate dimensions, with a high polish on the inner surface of the apertures.

Referring to Fig. 6, I have shown a further extension of my invention, that of clamping cylindrical work pieces 81 in such manner as to permit them to be movable in any direction while prevented from rotating during machining operation. A flexible band or tape 82 is secured by a screw 83 at one end and has a releasable connection 84 at the other end. Medially of its ends the surface of the tape is provided with a friction material 85, such as cork, which prevents the rotation of the ring after the tape has been looped thereabout, secured to the fixture and drawn tight by the honing tool when inserted therein to center the ring relative thereto. The honing operation is then effected in the same manner as above described in regard to honing the connecting rod bearings.

Referring to Fig. 7, I have shown a modified form of holder for a ring which may be employed with the fixture 31 above described. The holding tool 86 is similar to a connecting rod, being provided with a bearing end 87 and a wrist pin end 88, the bearing end 87 being split and hinged at 89 and having a releasable clamping element 91 for clamping the hinged element in fixed relation to the tool. A friction material 92, such as cork or the like, is provided about the inner surface of the bearing end 87 to be forced into intimate engagement with the outer surface of the ring 81 as the clamping element 91 is tightened. In this manner, the ring 81 is securely retained in the holder 86 which may be substituted for the connecting rod in the fixture to have the inner surface of the ring accurately machined.

When rings of various diameter sizes are employed, smaller than that which can be machined by the tools illustrated in Figs. 1 and 2, a smaller abrading head may be provided on the honing tool and when necessary a new guide bushing of smaller diameter, substituted for the guide bushing 78. The work holder 86 will function in the usual manner irrespective of the inner diameter of the ring 81.

So far, I have described a fixture for retaining work elements in such manner as to have them freely tiltable in any plane and retained against rotation. In Figs. 8 and 9, I have illustrated a fixture which is of modified form from that illustrated in Figs. 5 to 7 inclusive, which comprises means for positioning the work elements relative to the holes to be machined which are clamped in the aligned position while being held, to thereafter present the aligned surface to be machined to the operation of a boring or hone tools. The hollow cylindrical housing 95 is provided with a plurality of apertures 35, as illustrated in Fig. 5 in the housing 31, for the insertion of work elements 96 therein which are in the nature of hollow annular elements the inner surface of which is to be machined. Within the central aperture of the housing a plurality of the annular members 36 are disposed, which are similar to those illustrated in Fig. 5, being spaced apart by washers in the nature of spacers 56, all of which are mounted for upward and downward movement within the central aperture. Oppositely disposed pairs of plates 38, similar to those illustrated in Fig. 5, are disposed within the elements 36 retained apart by a plurality of springs 97 which are mounted on shoulder pins 98 that are riveted on the inner side of said plates in aligned relation. In this construction, the plates 38 are freely tiltable relative to the members 36 and also to each other, which is different from the construction illustrated in Fig. 5, wherein the plates were retained in fixed spaced relation to each other. The springs are of equal tension so as to evenly distribute the load throughout the assembled plates 38 and elements 36 to cause the elements and plates to be moved upwardly within the aperture, when the pressure is released from the top thereof, an even amount relative to each of the plates and elements.

For applying a pressure to the plates and elements, I utilize a threaded cap 99 which engages a plurality of threads 101 at the top outer surface of the housing. A plurality of ball bearings 102 spaced apart by a cage 103, are disposed between the top surface of the topmost element 36 and the inner surface of the cap 99. When the cap is screwed down upon the end of the housing 95 pressure is applied to the ball bearings which are moved downwardly to move all of the elements 36 downwardly therewith. The pressure of the topmost element is distributed to the topmost plate and then through the top work element to the adjacent plate and then to the second element 36 and so on to the third element down through all of the plates and elements to the bottom of the fixture. When the cap is completely tight, the plates 38 have engaged the work elements about the entire periphery of their side surfaces to rigidly retain them in aligned relation.

The work elements employed with this type of fixture, have the central aperture provided therein and after they are assembled between each of the pairs of plates 38, an expansible arbor is inserted through the center of the fixture having a pilot on the end thereof which is accurately aligned relative to the fixture through its engagement with a bearing 104 provided on the bottom of the housing 95. The arbor is then extended laterally to accurately center each of the work elements relative to the surface to be machined after which the cap 99 is screwed downwardly upon the housing to clamp the work elements in aligned position. Through the full floating movement provided to the plates, the work elements are clamped at all points about the periphery of its sides with the same pressure which prevents the distortion of the work elements and retains the work elements in aligned relation to each other relative to the aperture to be machined.

The novel clamping arrangement of the fixture will be readily apparent by examining each of the pairs of plates 38 as illustrated in Fig. 9. The two sets of topmost plates are illustrated as being in parallel relation, clamping a work element which has its sides disposed normal to the axis of its aperture. In the third set of plates, counting from the top of the fixture, it will be noted that both of the sides are in converging relation to each other, disposed at an angle to the axis of the aperture. In this construction, both of the plates 38 converge toward each other on the same slope as that of the sides of the work element, to thereby be in contact with the work element at all points of its circumference during the time that the aperture is retained in aligned relationship relative to the axis on which the original aperture was formed.

Referring to the lowermost set of plates 38 it will be noted that the plates are retained in parallel relation but disposed at an angle to the axis of the aperture in the work element. Such disposition of the plate obtains when the sides of the work element are parallel to each other but the axis of the aperture is disposed at an angle thereto. In a similar manner, when one of the sides of the work element is normal to the axis of the aperture and the other side is disposed at an angle thereto, one of the plates 38 will be retained parallel to the bottom of the fixture while the other plate will be tilted in accordance with the slope of the other side of the work element. In any construction, the work elements are clamped with equal pressure at all points of their circumference with the central apertures thereof aligned on the axis on which the original aperture was formed.

After the elements have been clamped in predetermined position, the expansible arbor is collapsed and removed from the fixture after which a boring tool 105 may be employed for rough machining the inner surface of the work element, after which the boring tool may be removed and the honing tool, illustrated in Figs. 1, 2 and 3, inserted for finishing the surfaces thereof. If the elements are ready for the finishing operation the use of the boring tool 105 may be dispensed with and the honing tool directly applied to the work. It is to be understood that in a similar manner the boring tool 105 may be employed in the fixture illustrated in Figs. 4 and 5 respectively.

It was found, that with fixtures, hereinabove illustrated and described, very fine dressing of work elements could be effected to machine them to a predetermined diameter which otherwise had to be scrapped in view of the fact that no means was provided for accurately centering the work elements relative to the surface originally machined thereon. When a few thousandths of an inch was required to be machined from the inner surface of the bearing in the ordinary grinding machine, only approximate setting of the work elements could take place, so that grinding would occur on one side thereof which could not be dressed down in view of the slight remaining stock.

A lubricating system, similar to that illustrated in Fig. 5, may be embodied within the housing 95 communicating with inlet and outlet ports 106 disposed in the bottom of the housing and communicating with a reservoir 107. In the construction illustrated in Fig. 9, it will be noted that the bearing 104 is of such construction as to be provided with sloping sides and top to prevent any of the abraded materials or shavings from working down between the surface of the pilot 105 and the inner surface of the bearing. In this manner the two reservoirs and the fluid circulating system employed in the structure illustrated in Fig. 5, may be dispensed with.

It is to be understood that the sleeve 78 may be attached to and made a part of the cap 99, or may be mounted thereabove, for the purpose of controlling the adjustment of the abrading elements relative to the surfaces of the work elements after the honing tool is inserted therewithin or to collapse the elements before the tool is withdrawn therefrom.

When the fixtures above described are employed, cylindrical apertures having lengths less than their diameters may be machined by a honing tool to extremely accurate dimensions in mass production. Heretofore, it has been necessary to employ the honing tool on work elements in which the aperture had a length at least equal to its diameter. This is accomplished by mounting the work elements so that they may adjust themselves to positions in which the axes of the apertures are aligned and correspond to the axis on which the apertures were originally formed.

The guiding elements on the honing tool may accurately position the aperture relative to the honing element, or the work elements may be clamped in the axial aligned position after which they may be machined to accurate dimensions.

For removing the work elements from the fixture illustrated in Figs. 8 and 9 I preferably construct the fixture from non-magnetic material and employ magnetic means at the mouth of the slots in the side thereof. After the plates 38 release the elements when the cap 99 is moved upwardly, the energization of the magnetic means causes the elements to move from the fixture which is immediately made ready to receive additional elements to be machined.

While I have described and illustrated various embodiments of my invention it will be apparent to those skilled in the art that various changes, omissions, additions and substitutions may be made therein without departing from the spirit and scope of my invention, as set forth in the accompanying claims.

I claim as my invention:

1. A method of machining an apertured work element which includes the steps, of mounting the work element for universal tilting movement, and of rotating a honing element in the aperture about a predetermined axis.

2. A method of machining apertured work elements, including the steps, of mounting a plurality of the work elements for tilting movement in substantially aligned relation, and of reciprocating a rotating honing element through the apertures.

3. A method of machining apertured work elements, including the steps, of mounting a plurality of the work elements for tilting movement in substantially aligned relation, of reciprocating a rotating honing element through the apertures, and of guiding the honing elements relative to the work elements by guides mounted on the honing tool.

4. The method of machining apertured work elements, including the steps, of mounting a plurality of substantially aligned work elements so as to have each supported for independent tilting movement, of retaining the work elements against rotation, and of reciprocating a rotating honing element through the apertures.

5. The method of machining apertured work elements, including the steps, of mounting a plurality of substantially aligned work elements so as to have each supported for independent tilting movement, of retaining the work elements against rotation, of reciprocating a rotating honing element through the apertures, and of aligning the work elements relative to the honing tool by guiding elements mounted thereon.

6. The method of machining apertured work elements, including the steps, of mounting a plurality of substantially aligned work elements so as to have each supported for independent tilting movement, of retaining the work elements against rotation, of reciprocating a rotating honing element through the apertures, of aligning the work elements relative to the honing tool by guiding elements mounted thereon, and of guiding said honing tool during its reciprocation.

7. The method of machining an apertured cylndrical work element, including the steps, of securing the work element against rotation in a holder, of mounting the holder for tilting movement, and of reciprocating a rotating honing element through the aperture.

8. The method of machining apertured cylindrical elements, the length of which are less than their diameter, including the steps, of securing the work elements in holders against rotative movement, of mounting a plurality of the holders in substantially aligned relation for a tilting movement, of securing the holder against rotation, and of reciprocating a honing tool through the apertures while the tool is rotating.

9. The method of machining an apertured cylindrical work element the length and thickness of which are less than the diameter including the steps, of securing the work element in holders against rotation, of mounting a plurality of holders in substantially aligned relation for independent tilting movement, of securing the holders against rotation, of reciprocating a rotating honing tool through the apertures, and of guiding said work elements relative to the honing element.

10. The method of machining an apertured cylindrical work element the length and thickness of which are less than the diameter including the steps, of securing the work element in holders against rotation, of mounting a plurality of holders in substantially aligned relation for independent tilting movement, of securing the holders against rotation, of reciprocating a rotating honing tool through the apertures, of guiding said work elements relative to the honing element, and of guiding said honing element relative to the mounting means for the holder.

11. The method of machining apertured work elements the lengths of which are less than their diameter, including the mounting of the work elements in aligned relation located from the surfaces to be machined, and of thereafter rotating a machining element in the aperture.

12. The method of machining apertured work elements the length of which are less than their diameter, including the steps, of mounting the work elements in aligned relation located from the surfaces to be machined, and of accurately centering the elements relative to each other by an expansible arbor, and of thereafter machining the surfaces of the apertures.

13. The method of machining apertured work elements, including the steps, of mounting the work elements in aligned relation located from the surfaces to be machined, of accurately centering the elements relative to each other by an expansible arbor, and of clamping each of the elements individually with equal pressure at all points on its side edges, and of thereafter machining the surfaces of the apertures.

14. The method of machining apertured work elements, including the steps, of mounting a plurality of work elements in spaced relation to each other between individual sets of tiltable plates, of accurately aligning the surfaces of the elements relative to each other from the surfaces of the apertures to be machined, of retaining said elements in aligned relation and against rotation, and of machining the inner surface of said apertures to exact dimensions.

15. The method of machining the apertures of a plurality of work elements to accurate dimensions which includes the aligning of the apertures from the surfaces thereof to be machined, and of thereafter rotating a machining element in the aperture.

16. A fixture for supporting a plurality of elements having apertures to be axially machined which includes, in combination, a plurality of pairs of tiltable plates between which the elements are insertable, a holder for said plates, means for accurately aligning the surfaces of the apertures relative to each other from the original surfaces thereon which are to be machined, and means for machining said surfaces.

17. A fixture for supporting a plurality of elements having apertures to be axially machined which includes, in combination, a plurality of pairs of tiltable plates between which the elements are insertable, a holder for said plates, means for accurately aligning the surfaces of the apertures relative to each other from the original surfaces thereon which are to be machined, means for machining said surfaces, and means for retaining said work elements against rotation.

KIRKE W. CONNOR.